(12) United States Patent
Bakker et al.

(10) Patent No.: US 7,515,408 B2
(45) Date of Patent: Apr. 7, 2009

(54) DESKTOP STAND FOR A DOCKING STATION AND A PORTABLE COMPUTER

(75) Inventors: Willem Hendrik Bakker, Almere (NL); Hendrik Gerrit Blom, Den Haag (NL); Jan Willem Elkhuizen, Leeuwarden (NL)

(73) Assignee: Bakker Elkhuizen Innovations B.V., CB Almere (NL)

( * ) Notice: Subject to any disclaimer, the term of this patent is extended or adjusted under 35 U.S.C. 154(b) by 0 days.

(21) Appl. No.: 11/084,353

(22) Filed: Mar. 18, 2005

(65) Prior Publication Data

US 2005/0207112 A1 Sep. 22, 2005

(30) Foreign Application Priority Data

Mar. 18, 2004 (EP) ................................. 04075886

(51) Int. Cl.
*H05K 7/12* (2006.01)
(52) U.S. Cl. ...................... 361/686; 361/681
(58) Field of Classification Search ................. 361/686, 361/681

See application file for complete search history.

(56) References Cited

U.S. PATENT DOCUMENTS

| | | | | |
|---|---|---|---|---|
| 5,553,824 A | | 9/1996 | Dutra, Jr. | |
| 5,633,782 A | * | 5/1997 | Goodman et al. | 361/683 |
| 5,699,226 A | * | 12/1997 | Cavello | 361/686 |
| 5,826,840 A | * | 10/1998 | Yun | 248/118 |
| 6,028,767 A | * | 2/2000 | Lan | 361/686 |
| 6,185,094 B1 | | 2/2001 | Ruch et al. | |
| 6,208,508 B1 | * | 3/2001 | Ruch et al. | 361/686 |
| 6,256,193 B1 | * | 7/2001 | Janik et al. | 361/683 |
| 6,480,376 B1 | * | 11/2002 | Nguyen et al. | 361/686 |
| 6,545,864 B2 | * | 4/2003 | Davis, IV | 361/683 |
| 6,913,238 B2 | * | 7/2005 | Bakker et al. | 248/460 |
| 2002/0122290 A1 | | 9/2002 | Davis, IV | |

FOREIGN PATENT DOCUMENTS

EP 1 301 847 4/2003
WO 02/06937 A1 1/2002

* cited by examiner

*Primary Examiner*—Lisa Lea-Edmonds
*Assistant Examiner*—Ingrid Wright
(74) *Attorney, Agent, or Firm*—Merchant & Gould P.C.

(57) ABSTRACT

A desktop stand for a docking station and a portable computer having a keyboard member and a display panel projecting from a rear end portion of the keyboard member. A fastener structure is provided for fastening the docking station to a support structure for supporting at least a portion of the keyboard member. An abutment for engaging the end of the keyboard member remote from the display is located at a distance of and faces the fastener structure when in operative position for fastening the docking station to the support structure. When in fixed condition, the fastener structure or the abutment is releasably fixed and, when in a released condition, allows adjustment of the distance from the abutment to the fastener structure.

12 Claims, 5 Drawing Sheets

DESKTOP STAND FOR A DOCKING STATION AND A PORTABLE COMPUTER

FIELD AND BACKGROUND OF THE INVENTION

The invention relates to a desktop stand for a docking station and a portable computer.

In practice, portable computers having a keyboard member and a display panel projecting from a rear end of the keyboard member when in operative condition and for instance pivotable to a position against the keyboard member, are usually denoted by the term "laptop computer", "laptop" or "notebook". Such computers are used not only during travel, but are also used frequently and for long periods in offices, in particular by users who use the computer regularly in different offices and/or at home.

Use of such a portable computer involves a number of ergonomic drawbacks. Firstly, the display is close to the keyboard. As a consequence, either the position of the display is not sufficiently high, which causes a great risk of neck complaints, or, if the computer is placed higher, the position of the keyboard is too high, so that, inter alia, the shoulder muscles are burdened unduly. Secondly, a laptop entails the drawback that it is not possible to place any documents between the keyboard and the display as is often desired in practice.

For partially overcoming the above drawbacks, it is known to operate a laptop computer using a separate keyboard connected to the computer only via a wire or via a wireless connection or to use a keyboard that may be dismounted from the keyboard member. The portable computer can then be placed on a desktop stand. An example of such a desktop stand is described in European Patent 1 301 847.

It is known from practice to mount a docking station to a desktop stand for supporting a portable computer. A docking station is a unit that includes an electrical connector that is positioned to be connected to a connector of the portable computer when the computer is docked to the docking station. Generally the docking station includes a bay or otherwise specifically shaped housing portion that guides the computer into its docking position. When using a docking station, the user who wants to connect a portable computer to desktop peripherals and power supply only needs to connect the computer to the docking station so that the connectors need not be connected individually. When the computer is disconnected the connectors need not be disconnected individually. Most docking stations also form a port replicator connected to the computer by a dedicated connector, the dedicated connector of the computer being wired to a plurality of standardized connecting ports. The docking station may have more ports for connecting other devices to the computer than the computer itself, for instance multiple ports such as VGA, DVI, S-Video, Parallel, Serial, PS/2, Headphone, S/PDIF, a number of USB ports, RJ-11 and RJ-45.

Docking the computer to a docking station mounted to a desktop stand is cumbersome because it requires the connector or connectors of the computer to be aligned with the connector or connectors of the docking station that is mounted on a support structure elevated above a desktop and sloping at a substantial angle, usually in the order of 30-60°. To reduce mechanical loads to which the connectors connecting the portable computer to the docking station are subjected, it is known to provide a support ledge that projects from a support structure for supporting the keyboard member and the docking station, which support ledge is urged towards the docking station by a spring force, such that an upward force is exerted along the support structure to the keyboard member.

SUMMARY OF THE INVENTION

It is an object of the present invention to provide a solution which facilitates connecting a laptop computer to a docking station on or of a desktop stand, yet allows docking keyboard members of different sizes and/or docking in docking stations of different designs and providing support for the keyboard member to at least reduce shear forces on connectors of the docking station and of the computer by supporting the keyboard member against sliding in downward direction along the support structure.

In accordance with the present invention, this object is achieved by providing a desktop stand for a docking station and a portable computer having a keyboard member and a display panel projecting from a rear end portion of the keyboard member, comprising:

a support structure for supporting at least a portion of the keyboard member, a bearing structure under said support structure such that at least a portion of said support structure-supported keyboard member located adjacent to the display panel is held at a higher level above a face on which the stand rests than a level at which an end of the keyboard member remote from the display panel is held, at least one fastener structure for fastening the docking station to the support structure, and at least one abutment for engaging the end of the keyboard member remote from the display panel at a distance of and facing the fastener structure when in operative position for fastening the docking station to the support structure, wherein, when in fixed condition, at least the fastener structure or the abutment is releasably fixed and, when in a released condition, at least the fastener structure or the abutment allows adjustment along the support structure of the distance from the abutment to the fastener structure.

By adjusting the distance from the abutment to the fastener structure and fixing the adjusted distance, a first time the computer is positioned on the support structure and docked to the docking station, the computer can easily and accurately be aligned with the docking station each next time, by causing the keyboard member to abut against the abutment and then lowering the end of the keyboard member where the display is connected until it engages the docking station.

According to another aspect of the invention, a desktop stand for a docking station and a portable computer is provided that has a keyboard member and a display panel projecting from a rear end portion of the keyboard member, and that comprises:

a support structure for supporting at least a portion of the keyboard member, a bearing structure under said support structure such that at least a portion of said support structure-supported keyboard member located adjacent to the display panel is held at a higher level above a face on which the stand rests than a level at which an end of the keyboard member remote from the display panel is held, and at least one fastener structure for fastening the docking station to the support structure, and wherein the fastener structure comprises an exchangeable interface member fastened to the support structure when in fixed condition and having members for engaging a docking station.

This allows the stand to be adapted in a simple manner for use in combination with different docking stations by exchanging the interface member.

According to yet another aspect of the present invention, a desktop stand for a docking station and a portable computer is provided that has a keyboard member and a display panel projecting from a rear end portion of the keyboard member, and that comprises:

a support structure for supporting at least a portion of the keyboard member, a bearing structure under said support structure such that at least a portion of said support structure-supported keyboard member located adjacent to the display panel is held at a higher level above a face on which the stand rests than a level at which an end of the keyboard member remote from the display panel is held, and at least one fastener structure for fastening the docking station to the support structure, further comprising a document deck extending above said support structure when in operative condition and pivotable away from the support structure about an axis located adjacent to a lower end of the support structure.

When the document deck is pivoted away from the support structure, positioning a computer on the support deck and removing a computer is facilitated, in particular if a docking station is attached to the support deck.

Further aspects, effects and details of the invention are described with reference to an example of a desktop stand according to the invention as shown in the drawings.

DETAILED DESCRIPTION

Figure 1:
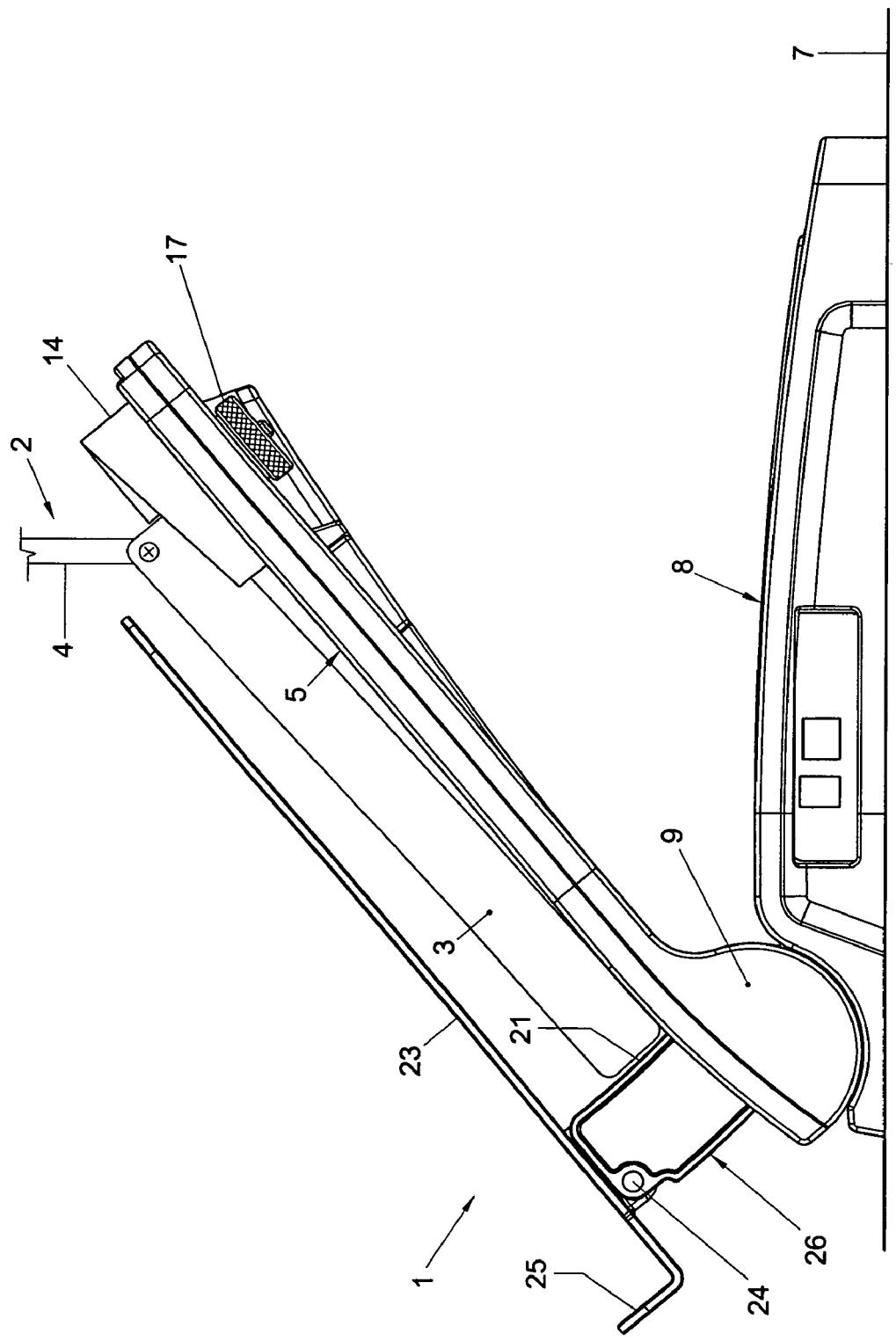
FIG. 1 is a side view of a stand according to an example of an embodiment of the invention supporting a docking station and a portable computer.

In the drawings a stand in its entirety is designated by reference numeral 1. The stand 1 is intended for supporting a portable computer 2 with a keyboard member 3 and a display panel 4 projecting from the keyboard member 3. According to the present example, the keyboard is an integral part of the keyboard member 3, but the keyboard may also be detachable from the keyboard member. For supporting the keyboard member 3, the stand 1 is provided with a support structure, according to this example in the form of a sloping support deck 5.

For keeping the support structure 5 in a position in which a portion of the keyboard member 3 located adjacent to the display panel 4 is held at a higher level above a face 7 on which the stand 1 rests than a level at which an end of the keyboard member 3 remote from the display 4 is held, the stand 1 is equipped with a bearing structure 8 under the support structure 5. The bearing structure 8 is provided in the form of a foot member 8 that is hinged to the support structure 5 at lockable hinges 9.

Figure 2:
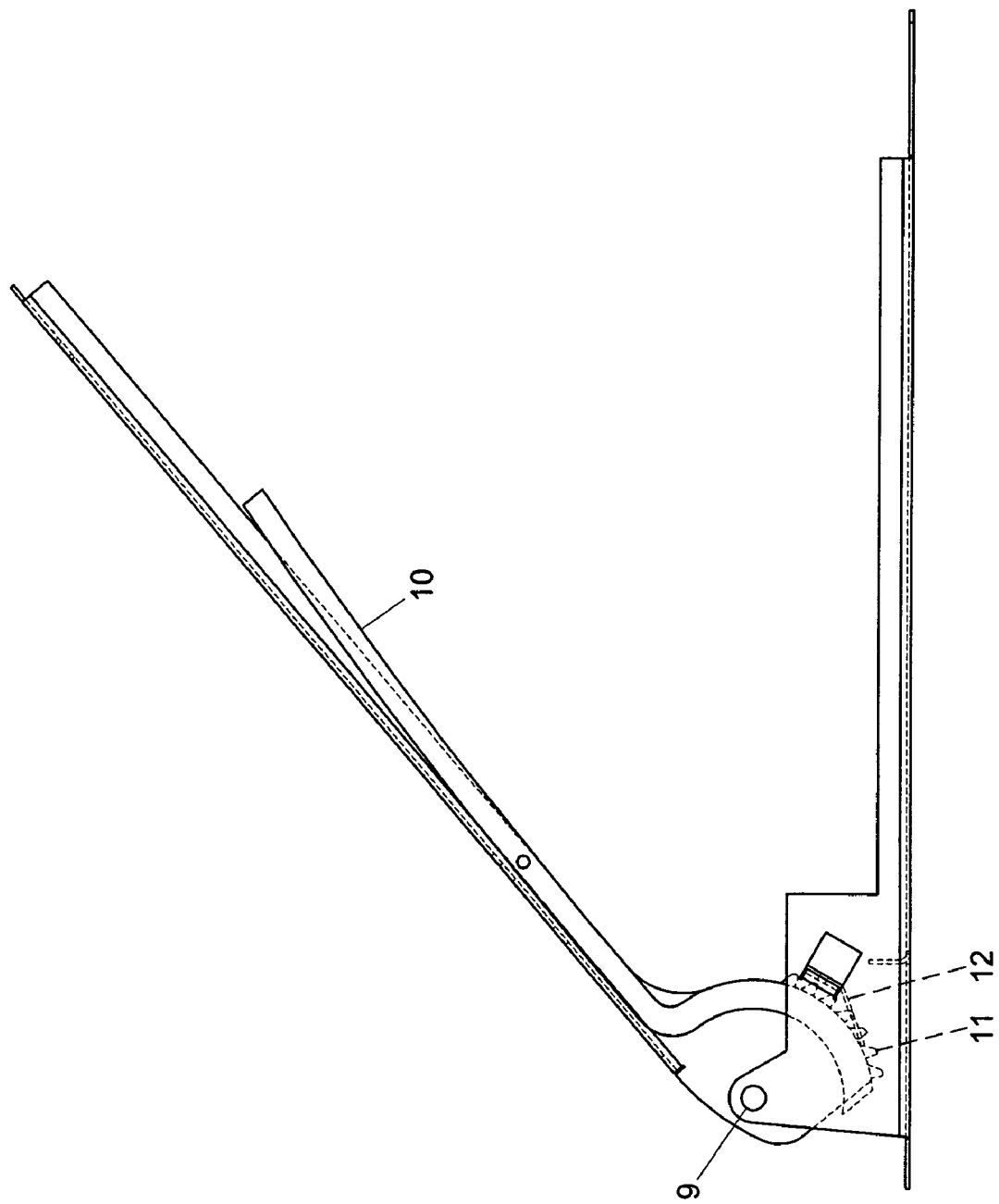
FIG. 2 is a side view of frame parts of the stand according to FIG. 1.

The construction of the hinges 9 is shown in FIG. 2. For locking the hinges 9, the support structure 5 comprises a pair of rows 11 of teeth that normally each engage a finger 12. For disengaging the fingers 12 from the teeth 11, a pair of double unlocking levers 10 are pivotably mounted to the support structure 5. By pushing the upper end portions of the unlocking levers 10 against the support structure, end portions 13 of the unlocking levers 10 extending along the rows of teeth 11 are moved away from the axis of the hinges 9 and urge the locking fingers 12 away from the rows of teeth 11 against an elastic force. When the fingers have been moved out of the trajectory of rotation of the rows of teeth about the axis of the hinge, the hinges are unlocked and freely adjustable to the desired angle between the support structure 5 and the bearing structure 8. When the unlocking levers 10 are released again, the fingers 12 push the levers back again and the fingers 12 and nearest teeth of the rows of teeth snap into engagement, again locking the support structure 5 relative to the bearing structure 8.

For fastening a docking station 14 to the support structure 5, a fastening structure is provided. According to the present example, the fastening structure includes an interface plate 15 from which threaded shafts 16 project, threaded knobs 17, and hook and loop pads 19. The hook and loop fasteners 19 each have a side coated with a pressure sensitive adhesive that adheres to the bottom of depression 18 in the interface plate 15 and the docking station 14 is equipped with loop or hook surfaces adapted for co-operation with the hook or loop surfaces of the pads 19. Projections 20 on the interface plate 15 are positioned and dimensioned to accurately fit in recesses in the bottom of the docking station 14.

When the fastener structure 15-20 is in operative position for fastening the docking station 14 to the support structure 5, the shafts 16 project through slots 22 in the support structure 5 and the interface plate 15 is fixedly clamped to the support structure 5 by the knobs 17 that are tightly screwed onto the shafts 16 and exerts forces pulling the interface plate 15 against the support structure 5. The docking station 14 is releasably fixed to the interface plate 5 by the hook and loop pads 19 and shear forces are transferred via the projections 20 engaging recesses in the bottom of the docking station 14.

By unscrewing the knobs 17, the interface plate 15 is released to such an extent that its position, and thereby the position of the docking station 14 attached thereto, may be adjusted in the direction of the slots 22. When releasing the fixation, the knobs 17 may be turned just enough to reduce the clamping forces exerted thereby to allow the adjustment or the knobs 17 may be turned so that no clamping forces are exerted thereby at all. However, it is preferred not to completely unscrew the knobs 17 from the shafts 16, so that the knobs stay connected to the stand 1.

For engaging the end of the keyboard member 3 remote from the display 4, the stand 1 is furthermore equipped with abutments 21 at a distance of and facing the fastener structure 15-20 when in operative position for fastening the docking station 14 to the support structure 5.

Because, when in fixed condition, at least the fastener structure or the abutment is releasably fixed and, when in a released condition, allows adjustment of the distance from the abutment 21 to the fastener structure 15-20, the distance can easily and accurately be adjusted to the particular computer/docking station combination to be used in with the stand, by adjusting the position of the computer docked to the docking station 14 so that it abuts the abutments 21 and then tightening the knobs 17 so that the distance from the interface plate 15, and thereby from the docking station, to the abutment 21 is fixed, and the next time a computer is positioned against the abutments 21, it is accurately positioned relative to the docking station 14, at least in the direction of abutment against the abutments 21. In practice, it may be advantageous to leave a little play and/or elasticity to allow the connectors of the docking station 14 and the computer 2 to be wiggled into precise alignment.

Because the fastener structure 15-20 is displaceable along the support structure 5 when in released condition for allowing adjustment of the distance from the abutment 21 to the fastener structure 15-20, the adjustment also allows for adjusting the position of the fastener structure 15-20 to accommodate to the position of the display 4 relative to the position of docking station 14, which differs between different docking stations. If the keyboard member 3 is particularly short, fill-up elements may be positioned between the abutments 21 and the keyboard 3.

Because the slots 22 guide the fastener structure 15-20 towards and away from the abutments 21 when the fastener structure 15-20 is in said released condition, adjustment of the fastener structure is easy and lateral centering of the fastener structure 15-20 is maintained during readjustment.

The slots in the support structure 5 not only guide the fastener structure 15-20 during adjustment, but also allow reliable clamping of the fastener structure 15-20 to the support structure 5 using shafts projecting through the slots and clamps, here in the form of the knobs 17.

The interface member formed by the interface plate 15 that is fastened to the support structure 5 when in fixed condition and having members 20 for engaging the docking station 14 is exchangeable. This allows exchanging the interface member to be exchanged for another interface member of a different design dedicated for mounting a different docking station thereto. Thus, the stand 1 may be adapted for use in combination with different docking stations in a simple manner by exchanging the interface member. It is observed that this feature is in principle also advantageous for easily adapting the stand for use in combination with different docking stations if the fastener structure or the abutment is not releasably fixed for allowing adjustment along the support structure of the distance from the abutment to the fastener structure. However, because in the released condition, the interface member 15 is displaceable to and from the abutment 21, the adjustability of the distance and the adaptability for attaching different docking stations is achieved with an efficient construction.

If a kit is provided that includes a stand and two or more exchangeable interfaces, each fastenable to the support structure, at least as an alternative to the other, the user is provided with a particularly convenient out-of-the box versatility.

Figure 4:
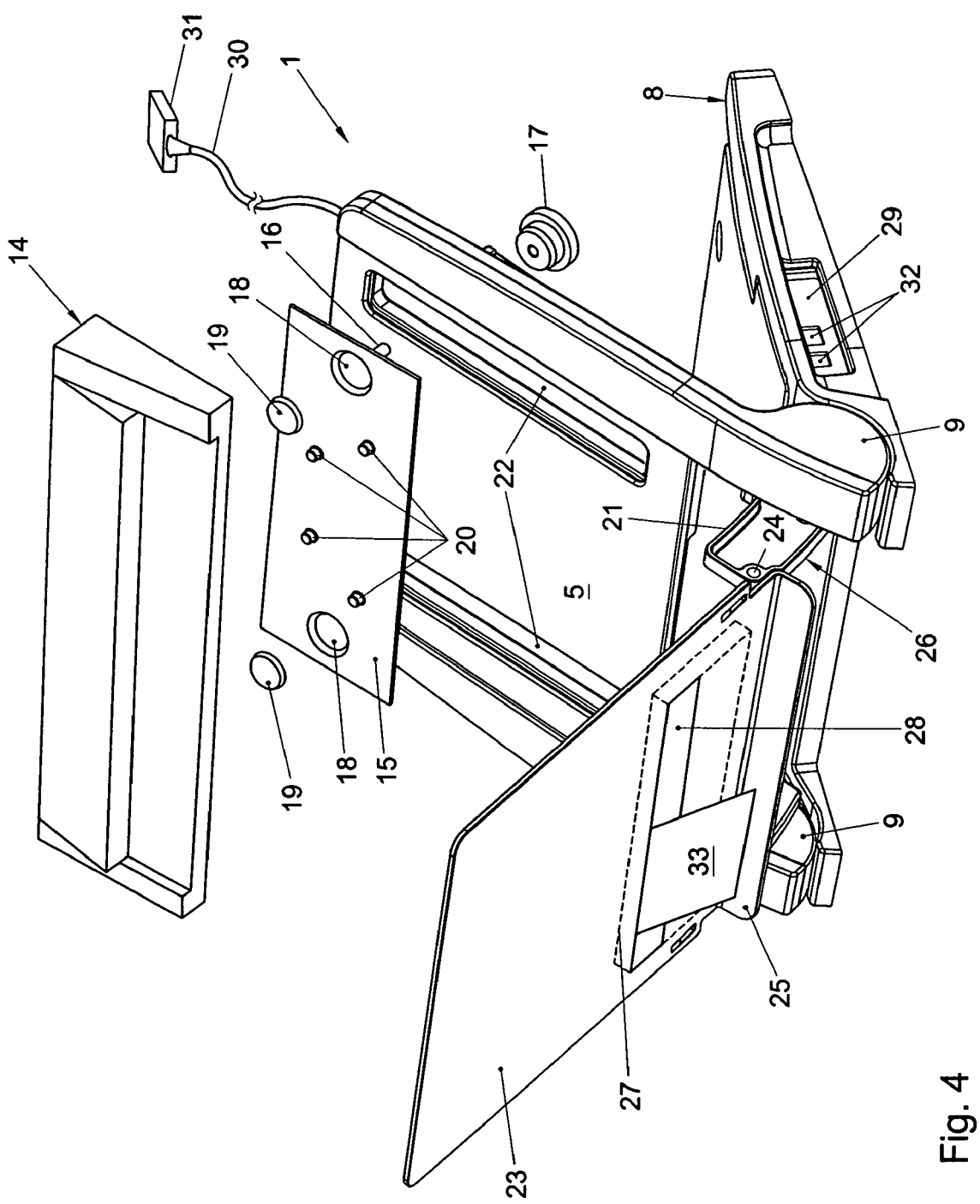
FIG. 4 is a perspective view of a version of the support according to FIGS. 1-3 equipped with an office supplies dispenser, in which a docking station and a fastening structure of the stand are shown in exploded view.
Figure 5:
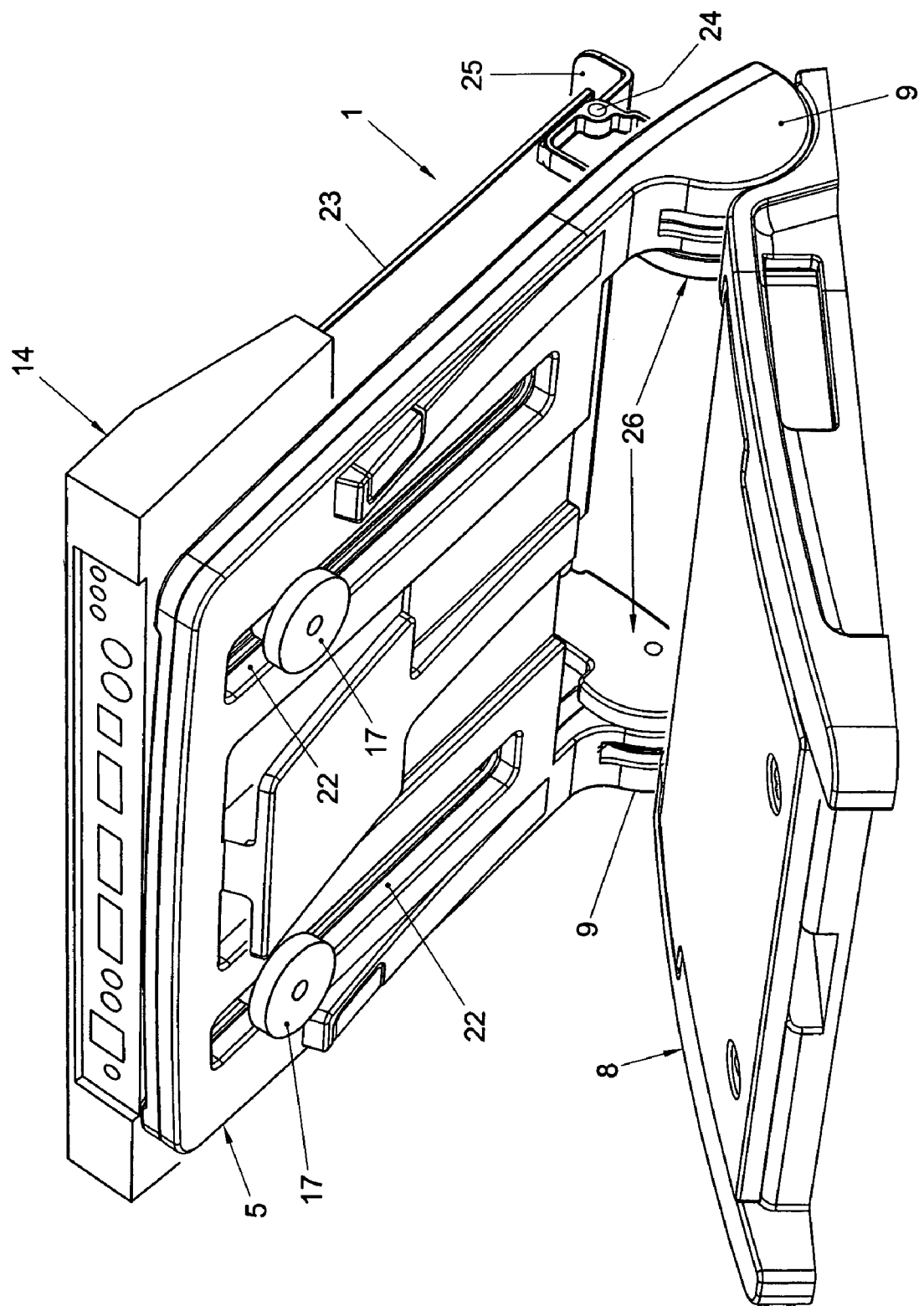
FIG. 5 is a perspective view of the support according to FIGS. 1-4 with a docking station mounted thereto.

Versatility of the desktop stand 1 is further improved if, as in the present example, the foot member 8 furthermore forms a housing for a port replicator 29. The port replicator 29 may have a housing that is accommodated in the foot member 8 or the foot member 8 itself may form the housing in which the port replicator circuitry is mounted (of which two connectors 32 are shown in FIG. 4). A connecting cable 30 with a connector 31 is provided for connection of the port replicator 29 to the computer on the desktop stand 1, so that also for computers for which no docking station is available a port replicating function can be made available. The cable 30 is guided through the stand to a position at a free end of the support structure 5, which is close to the connectors of the computer when the stand 1 is in use. Such a port replicating function is preferably analogous to the port replicating function of a docking station, but also be of a more limited nature, such as providing a plurality of connections of the same type of the connection of the computer to which the port replicator is to be connected. Preferably the port replicator includes a plurality of ports of different types for connection to peripherals and a network and only a single connector, such as a USB connector, for connection to the computer.

The stand according to the present example further comprises a document deck 23 with a stop 25 at a lower end. The document deck 23 extends above the support structure 5 when in operative condition and pivotable away from the support structure 5 about an axis 24 located adjacent to a lower end of the support structure 5. When the document deck 23 is pivoted away from the support structure 5, for instance in a position as shown in FIG. 4, positioning a computer on the support deck 5 and removing a computer is facilitated. The presence of the docking station 14 may also cause that it is required to pivot the document deck 23 away from the support structure 5 to allow the computer to be docked or undocked to be passed by the docking station at all. This effect of the movability of the document deck away from the support structure of at least facilitating docking and undocking of the computer is in principle also achieved if the fastener structure or the abutment is not releasably fixed for allowing adjustment along the support structure of the distance from the abutment to the fastener structure and/or if no docking station is attached to the support structure 5. However, the pivotability of the document deck 23 away from the support structure 5 is of particular advantage if a docking station 14 is mounted to the support structure 5, because the passage between the document deck 23 and a docking station 14 is generally very narrow and may in some cases be so narrow that a keyboard member 3 cannot be passed through at all.

Figure 3:
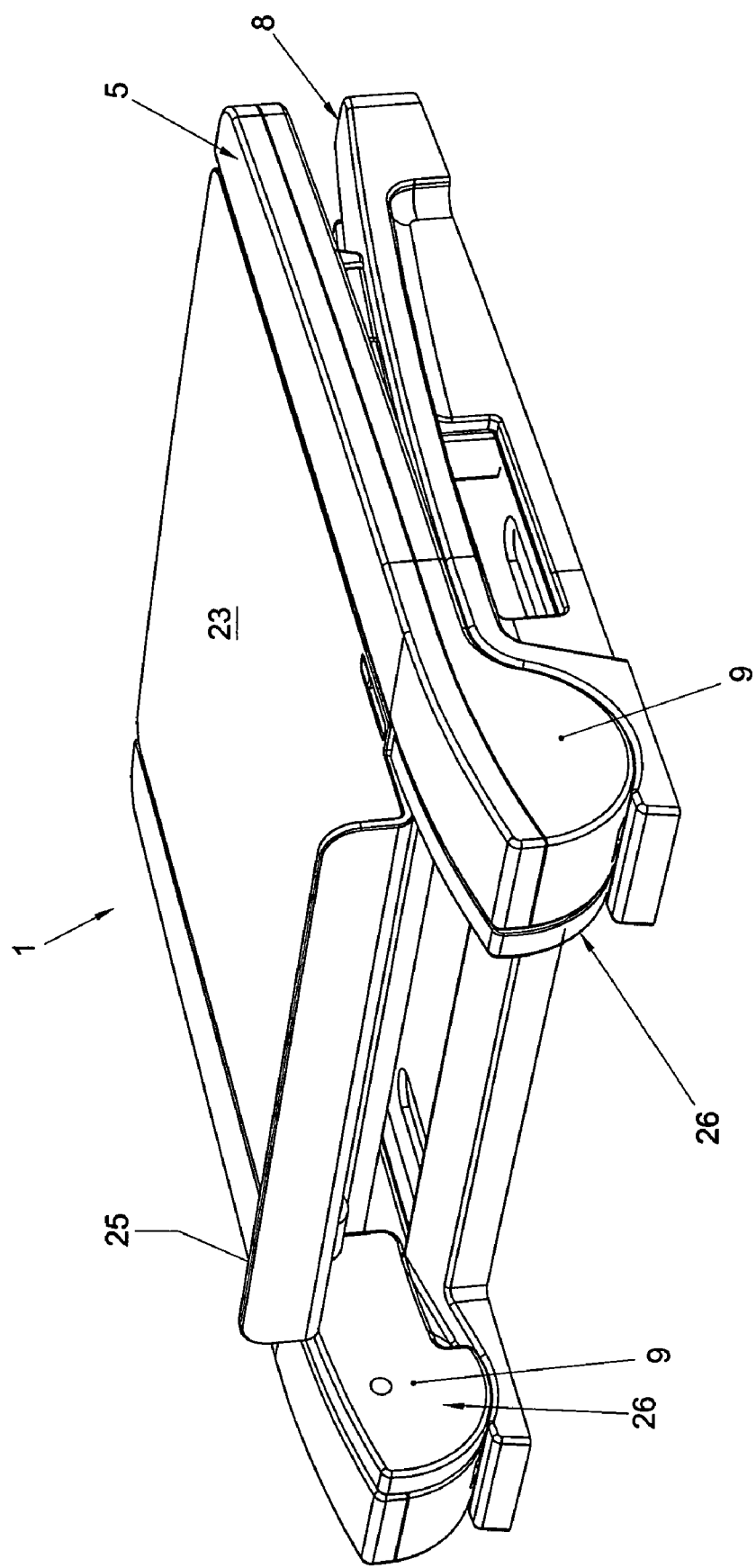
FIG. 3 is a perspective view of the stand according to FIGS. 1 and 2 in collapsed condition.

The document deck 23 is pivotably suspended to arms 26 that are each pivotable between a position projecting from the support structure 5 (FIGS. 1, 3-5) and a position extending along the support structure (FIG. 3). This allows the stand 1 to be collapsed to a very flat configuration, for storage, packaging and transport and also allows to bring the document deck 23 in a position in which it lies on the support structure 5 and/or the docking station 14. This allows to support very heavy objects, because the document deck 23 is then also supported by the support structure 5 in positions remote from the hinging axis 24.

The angle at which the document deck 23 projects from the arms 26 and is oriented relative to the sloping angle of the support structure 5 when the arms 26 are each in a position projecting from the support structure 5 (FIGS. 1, 3-5) is adjustable to accommodate for differences in thickness between different keyboard members 3 and different docking stations 14.

As is shown in FIG. 4, the document deck 23 may be provided with a storage for office supplies. The storage is preferably provided in the form of a dispenser for dispensing office supplies. According to this example the dispenser is provided in the form of a dispenser for individually dispensing office supplies. The office supplies that may be dispensed with the dispenser according to this example are small leaflets 33 with self-adhesive strips and/or self-adhesive tabs. The dispenser is formed by a chamber 27 behind the upper face of the document deck 23 and a slot 28 in the upper face of the document deck 23 via which the leaflets and tabs can be taken from the dispenser. That the document deck 23 is equipped with a dispenser is in principle also advantageous if the fastener structure or the abutment is not releasably fixed for allowing adjustment along the support structure of the distance from the abutment to the fastener structure. However, for accessibility of the chamber 27 from the side of the support structure, it is particularly advantageous if, as in the present example, the document deck 23 is pivotable between its operating position and a position away from the support structure 5. The dispenser for office supplies may also be adapted for dispensing or temporarily storing other office supplies, such as paperclips, writing tools, stationery, erasers etc.

It will be readily understood by anyone skilled in the art that within the framework of the present invention as set forth in the claims, still many other variants and structural possibilities are conceivable. For instance, instead of a hinged bearing structure, for instance fixed support legs or wall may be provided, a single abutment, of which the position is adjustable or not may be provided, a document deck may be absent or provided in another, for instance removable form and/or fasteners may directly engage the docking station without presence of an interface plate between the docking station and the support structure.

What is claimed is:

1. A desktop stand for a docking station and a portable computer having a keyboard member and a display panel projecting from a rear end portion of the keyboard member, comprising:
   a support structure for supporting at least a portion of the keyboard member,
   a bearing structure under said support structure such that at least a portion of said keyboard member located adjacent to the display panel is held at a higher level above a face on which the desktop stand rests than a level at which an end of the keyboard member remote from the display panel is held,
   at least one fastener structure mounted to the support structure for fastening the docking station to the support structure, and
   at least one abutment for engaging the end of the keyboard member remote from the display panel at a distance of and facing the fastener structure when in operative position for fastening the docking station to the support structure,
   wherein, when in a fixed condition, at least the fastener structure or the abutment is releasably fixed and, when in a released condition, at least the fastener structure or the abutment allows adjustment along the support structure of the distance from the abutment to the fastener structure and fixing of the fastener structure at any of a plurality of distances from the abutment.

2. A stand according to claim 1, wherein said fastener structure is displaceable along said support structure when in released condition for allowing adjustment of the distance from the abutment to the fastener structure.

3. A stand according to claim 1, further comprising at least one guide for guiding movement of at least the fastener structure or the abutment towards and away from the other when in said released condition.

4. A stand structure according to claim 3, wherein the at least one guide comprises a slot in the support structure, through which the fastener structure projects.

5. A stand according to claim 1, further comprising a document deck extending above said support structure when in operative condition and comprising a storage for office supplies.

6. A stand according to claim 5, wherein the storage is provided in the form of a dispenser for dispensing office supplies.

7. A stand according to claim 1, further comprising a housing for a port replicator or for port replicator circuitry.

8. A stand according to claim 1, further comprising a document deck extending above said support structure when in operative condition, the document deck being pivotable between a position projecting from the support structure and a position extending along the support structure.

9. A desktop stand for a docking station and a portable computer having a keyboard member and a display panel projecting from a rear end portion of the keyboard member, comprising:
   a support structure for supporting at least a portion of the keyboard member,
   a bearing structure under said support structure such that at least a portion of said keyboard member located adjacent to the display panel is held at a higher level above a face on which the desktop stand rests than a level at which an end of the keyboard member remote from the display panel is held, and
   at least one fastener structure for fastening the docking station to the support structure,
   wherein the fastener structure comprises an exchangeable interface member arranged between the support structure and the docking station and fastened to the support structure when in fixed condition and having members for positioning the docking station relative to the exchangable interface and the support structure.

10. A stand according to claim 9, further comprising at least one abutment for engaging the end of the keyboard member remote from the display panel at a distance of and facing the fastener structure when in operative position for fastening the docking station to the support structure, wherein, in a released condition, the exchangable interface member is displaceable to and from the abutment.

11. A kit including a stand according to claim 9, comprising at least a first and a second exchangeable interface, each fastenable to the support structure, at least as an alternative to the other.

12. A desktop stand for a docking station and a portable computer having a keyboard member and a display panel projecting from a rear end portion of the keyboard member, comprising:
   a support structure for supporting at least a portion of the keyboard member,
   a bearing structure under said support structure such that at least a portion of said keyboard member located adjacent to the display panel is held at a higher level above a face on which the desktop stand rests than a level at which an end of the keyboard member remote from the display panel is held, and
   at least one fastener structure for fastening the docking station to the support structure,
   further comprising a document deck extending above said support structure in a first orientation when in operative condition and pivotable away from the support structure about an axis located adjacent to a lower end of the support structure, from the first orientation to a second orientation projecting away from the support structure.

* * * * *